United States Patent [19]
Perelle

[11] Patent Number: 5,910,723
[45] Date of Patent: Jun. 8, 1999

[54] SYSTEM FOR MONITORING THE CHARGING OF A MODULAR SET OF ELECTROCHEMICAL CELLS CONNECTED IN SERIES AND A CORRESPONDING CELL MEASUREMENT MODULE

[75] Inventor: Michel Perelle, Parcay-Meslay, France

[73] Assignee: SAFT, Romainville, France

[21] Appl. No.: 08/859,274

[22] Filed: May 20, 1997

[30] Foreign Application Priority Data

May 21, 1996 [FR] France .................................. 96 06 273

[51] Int. Cl.⁶ .................................................. H01M 10/46
[52] U.S. Cl. ............................................................ 320/119
[58] Field of Search .................................... 320/110, 116,
320/119, 121, 122, 125, 136, 160, 162,
163, FOR 104, FOR 114, FOR 121, FOR 129,
FOR 138

[56] References Cited

U.S. PATENT DOCUMENTS

| | | |
|---|---|---|
| 5,438,252 | 8/1995 | Perelle . |
| 5,523,668 | 6/1996 | Feldstein .............................. 320/119 X |
| 5,578,914 | 11/1996 | Morita ....................................... 320/122 |

FOREIGN PATENT DOCUMENTS

| | | |
|---|---|---|
| 0121547 | 12/1986 | European Pat. Off. . |
| 0693814 A1 | 1/1996 | European Pat. Off. . |
| 2684249 | 4/1994 | France . |
| WO92/06525 | 4/1992 | WIPO . |
| WO93/15544 | 8/1993 | WIPO . |
| WO96/12333 | 4/1996 | WIPO . |

*Primary Examiner*—Edward H. Tso
*Attorney, Agent, or Firm*—Sughrue, Mion, Zinn, Macpeak & Seas, PLLC

[57] ABSTRACT

A system and a system module for monitoring charging in a set made up of a plurality of electrochemical cells connected in series and governed by a central unit. Each cell is associated with a respective interface including a module comprising means for measuring the voltage between the terminals of the cell and means for providing an image signal of the measured voltage for use by the common control unit. Each module further comprises a precision measurement circuit providing an image signal at high amplification for the central unit whenever the measured voltage corresponds to a reference value that is defined for the precision measurement circuit and is optionally modifiable.

12 Claims, 1 Drawing Sheet

SYSTEM FOR MONITORING THE CHARGING OF A MODULAR SET OF ELECTROCHEMICAL CELLS CONNECTED IN SERIES AND A CORRESPONDING CELL MEASUREMENT MODULE

The invention relates to a system for monitoring the charging of a modular set made up of a plurality of electrochemical cells which are connected in series by their respective power supply terminals between two such terminals situated at the ends of the set, said system associating with each cell a measurement module that includes means for measuring the voltage between the power supply terminals of the cell and means for delivering measurement signals to a common charge control unit acting in particular on the modules.

BACKGROUND OF THE INVENTION

Such a system is described, in particular, in document FR-A-2 684 249.

Nevertheless, in certain applications, and in particular when the modular assembly as mentioned above is intended for powering an electric vehicle, it can be particularly important for very accurate measurements to be available to such a system. Such measurements can improve management of the modular assembly while it is in use, in particular when a high level of reliability and long life are required and when there also exists major risks in the event of wrong operation, e.g. in the event of cells in a modular set being overcharged during charging. It is particularly important to be able to verify that the measurement means are operating properly, e.g. in order to be sure that they are continuing to give accurate results and consequently to be in a position to recalibrate them, should that be necessary.

Document EP-A-0 121 547 describes a charging regulator for a modular set of electrochemical cells intended more particularly for emergency use, and consequently requiring to be maintained almost constantly recharged to an optimum value. Each cell is provided with an individual circuit connected to the power supply terminals of the cell and measuring the voltage between those terminals for the purpose of regulating the charging current applied to the cell by progressively bypassing charging current through a circuit external to the cell, starting from a determined bypass trigger voltage, so as to bring the cell safely to its optimum charge. Such a circuit is nevertheless ill-adapted to obtaining optimum charge in a cell that forms part of a modular set which is necessarily subjected to large variations in state of charge, as is particularly likely to be the case of a set used as the power supply for an electric vehicle.

OBJECTS AND SUMMARY OF THE INVENTION

The invention thus proposes a system for controlling charging of a modular set made up of a plurality of electrochemical cells which are connected in series via their respective power supply terminals between two such terminals situated at the ends of the set, said system being governed by a central control unit and associating each cell with an individual interface provided with a measurement module which comprises means for measuring the voltage that exists between the power supply terminals of the cell and means for delivering a signal that is an image of the measured voltage to the central control unit via a measurement transducer and under the control of said central control unit.

According to a characteristic of the invention, each module further comprises a precision measurement circuit having a multiplying effect, enabling the interface to deliver an image signal with a large amount of amplification when the measured voltage corresponds at least approximately to a reference value that is defined for the measurement circuit and is optionally modifiable, said circuit delivering a signal to the central control unit via the common measurement transducer, which signal is an accurate image of the voltage present across the power supply terminals of each cell when the measured voltage is in the vicinity of the reference value.

According to a characteristic of the invention, the central control unit comprises means enabling it to control accurately a reduction in charging current delivered to the set by a charger, by making use of the image signals provided by the respective precision measurement circuits of the interfaces associated with the cells in the set, as the voltages individually present across the power supply terminals of said cells progressively reach said defined reference value.

According to a characteristic of the invention, the central control unit includes means enabling it to determine the internal resistance of each cell of the set under its control by determining the change of voltage obtained by the precision measurement circuit associated with the cell under consideration in response to a determined change in the charging current delivered to the set by the charger under its control.

According to a characteristic of the invention, the measurement module of an individual cell interface includes another measurement circuit suitable for providing a measurement signal representative of the voltage present across the power supply terminals of the cell with which the interface is associated, and switch means under the control of the central control unit for selectively directing to said central control unit the image signals provided by each of the measurement circuits associated with the same cell.

According to a characteristic of the invention, the central control unit includes means enabling the measurement circuit associated with a cell to be calibrated by means of the precision measurement circuit associated with the same cell.

The invention also provides a module for measuring the voltage between the terminals of an electrochemical cell of a modular assembly where such cells are connected in series, in the context of a monitoring system governed by a central control unit and in which each module comprises means for measuring the voltage between the power supply terminals of a corresponding electrochemical cell with which it is associated and means for delivering an image signal representing the measured voltage to the central control unit via a common measurement transducer under the control of said unit.

According to a characteristic of the invention, the voltage measuring means of each cell further comprise a precision measurement circuit having a multiplying effect enabling it to provide an image signal with a large amount of amplification when the voltage it measures corresponds at least approximately to a reference value that is defined for that circuit and is optionally modifiable, thereby supplying the central control unit with an accurate image signal of the voltage present across the power supply terminals of the cell associated therewith when the measured voltage is in the vicinity of the reference value.

BRIEF DESCRIPTION OF THE DRAWING

The invention, its characteristics, and advantages, are described in detail below with reference to the following figures.

MORE DETAILED DESCRIPTION

Figure 1:
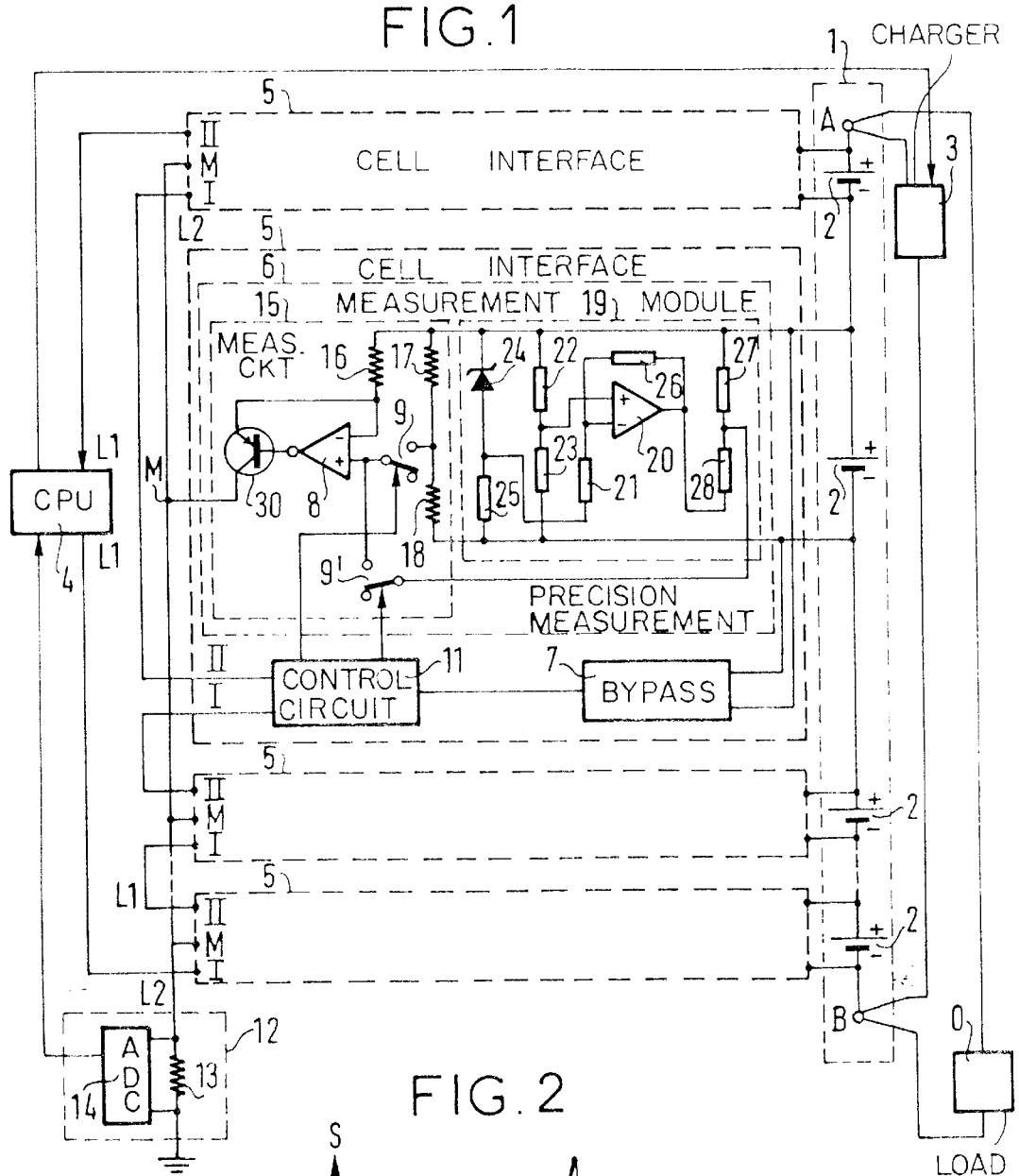
FIG. 1 is a diagram of a system of the invention for monitoring charge on a modular set made up of a plurality of electrochemical cells connected in series by their respective power supply terminals.

The diagram of FIG. 1 shows a load circuit O designed to be powered by a modular assembly 1 of the electrical storage battery type, itself being made up of a plurality of identical electrochemical cells 2 connected in series via their respective power supply terminals which are referenced "+" and "−".

The cells 2 are identically made up of one or more individual electrochemical cells proper which are likewise practically identical.

The set 1 is suitable for being connected, at least temporarily, to a charger 3 with the set being connected to the feed terminals thereof via end terminals referenced A and B. The charger may be of conventional type, and it is assumed to be under the control of a system serving in particular to monitor charging of the set 1, said system comprising a central control unit 4 making it possible in particular to monitor charging and to balance charge between the cells 2 by means of interfaces 5 individually associated with respective ones of the cells. Each interface 5 is consequently connected to the "+" and "−" power supply terminals of the cell 2 to which it is allocated.

By way of example, the central control unit 4 is organized around a microcontroller (not shown) having input/output ports, in particular for interchanging signals with the interfaces 5 and with the charger 3. The charger may be a conventional model and it is not described in further detail herein, given that it has no direct bearing on the subject matter of the invention.

Each interface 5 comprises, in particular, means enabling it to measure the voltage V present between the "+" and "−" power supply terminals of the cells 2 with which it is associated, said means being assumed to be implemented in the form of a measurement module 6. In the interface example 5 shown herein, there is a current bypass module 7 associated with each measurement module 6 at the power supply terminals of the cell 2 with which the interface is associated. This module serves to establish a bypass link between the terminals of the cell and consequently to balance cell charge in well-known manner. Each bypass module is governed by the central control unit 4 via a control circuit 11 which also serves to control the measurement module 6 of the interface.

The bypass modules 7 are not described in greater detail herein given that they have no direct bearing on the subject matter of the present invention.

The respective control circuits 11 of the interfaces 5 in the monitoring system are assumed herein to be connected in series to the central control unit 4 via a single wire control link L1 to which each interface 5, or more precisely each control circuit 11 is connected via two terminals I and II. The control link L1 is assumed in this case to carry control pulses in the form of successive pulse trains issued by the central control unit 4.

Control organized by means of such pulse trains is described, in particular, in documents FR-A-2 713 781 and FR-A-2 719 126 which relate respectively to pulses being transmitted in one direction only, and to pulses being transmitted optionally in either direction.

In the present embodiment, the control circuit 11 in each interface 5 monitors the information delivered by the measurement module 6 of the interface for use by the central control unit 4, with said information being conveyed via a measurement transducer 12. The measurement modules 6 used herein can be considered as being current generators insofar as they are designed to deliver measurement signals that are transmitted in the form of currents to the measurement transducer 12 that is used in common by all of the modules. Each measurement module generates a current which is the image of the value that it measures, said current being for transmission to the transducer 12. By way of example, the transducer comprises a measurement resistor 13 associated with a converter device 14 which digitizes and optionally preprocesses signals for the benefit of the central control unit 4 to which the converter unit 14 is connected.

To this end, each measurement module 6 transmits the measurement signals obtained for the cell with which it is associated to the common measurement transducer 12. This transmission takes place over a common measurement link L2 to which each measurement module is connected via a respective output M.

In a preferred embodiment, each measurement module 6 includes at least means for measuring the voltage V existing between the power supply terminals of the cell 2 with which the interface 5 including the module 6 is associated.

To this end, these means include at least one measurement circuit 15 enabling the voltage V present between the "+" and "−" power supply terminals of the associated cell 2 to be determined over the entire range of voltages monitored across the terminals of the cell.

By way of example, the measurement circuit 15 is constituted by a conventional circuit comprising an operational amplifier 18 controlled as a function of the voltage V via a bridge comprising two resistors 17 and 18 connected in series, and switched on by means of a switch member 9 by the control circuit 11 which is itself governed by the central control unit 4.

The resistors 17 and 18 are connected to the terminals of the cells 2 where the voltage is to be measured, and the common point between the resistors is connected to the non-inverting input "+" of the operational amplifier 8 via the switch member 9 when it is actuated. The inverting input "−" of the operational amplifier 8 is connected to the positive power supply terminal of the cell 2 via a resistor 16, and the output of the operational amplifier is applied to the base of a transistor 30. In this case, the transistor has its emitter connected to the same potential as the inverting input of the operational amplifier 8, and it delivers a current that is a function of the level of the signal appearing on the non-inverting input "+" of the amplifier. The current flowing via the collector of the transistor 30 is an image of the voltage present at the non-inverting input "+" of the operational amplifier 8, and it is applied to the output M of the measurement circuit 15 and of the measurement module 6 containing the amplifier and the transistor. By way of example, such a measurement circuit 15 can provide measurement accuracy of the order of 0.5%, and in general that is sufficient.

A precision measurement circuit 19 is also connected to the "+" and "−" power supply terminals of a cell 2 in parallel with the measurement circuit 15 associated with the cell to make it possible to obtain a finer measurement of the voltage V, e.g. at the end of charging, and in the vicinity of a selected value for the measured voltage taken as a reference. This reference value is suitable for being defined by the components of the measurement circuit and can thus optionally be modified.

The precision measurement circuit 19 associated with a cell 2 may be constituted, for example, by a circuit comprising a differential amplifier 20 whose non-inverting input "+" is connected to the common point between two resistors 22 and 23 of a divider bridge connected between the "+" and "−" terminals of the associated cell 2. The inverting input "−" of the differential amplifier 20 is connected firstly to the output of said amplifier via a negative feedback resistor 26, and it is also connected via a resistor 21 to the common point of a circuit comprising a zener diode 24 and a resistor 25 connected in series between the "−" and "+" terminals mentioned above. The differential amplifier 20 delivers an output signal when the voltage V measured across the terminals of the cell exceeds a threshold value VS which is set essentially by the diode 24 and by the resistors 22 and 23. This value is selected, for example, to be close to the voltage that is present across the power supply terminals "+" and "−" of a cell at the end of charging.

The output from the amplifier 20 fed back to the inverting input thereof via the negative feedback resistor 26 is applied to a first end of a branch of a circuit comprising two resistors 27 and 28 connected in series with its second end being connected to the positive power supply terminal "+" of the associated cell 2, as are the resistor 22 and the anode of the zener diode 24. The common point between the two resistors 27 and 28 is suitable for being connected to the non-inverting input "+" of the operational amplifier 8 via a switch member 9' actuated by the control circuit 11 of the corresponding interface. In conventional manner, the switch members 9 and 9' can be actuated in alternation and are suitable for being combined in a common unit, which may optionally also receive other signals to be transmitted separately or not transmitted, depending on requirements.

For the precision measurement circuit 19, the selected ratio between the resistances of the resistors 22 and 23 defines, in association with the voltage defined by the zener diode 24, the value of the reference voltage relative to which the measurement is to be performed. A low resistance potentiometer (not shown) may optionally be inserted between the resistors 22 and 23 to enable the value of the reference voltage to be adjusted, if necessary.

Given the bridges constituted by resistors 22 & 23 and resistors 27 & 28, the ratio selected for the resistances of resistors 21 and 26 serves to define the desired amplification factor around the value selected for the reference voltage, with said factor being selected, for example, to be of the order of 10, 100, or 1000, thus enabling an accurate image signal to be delivered of the measured voltage V.

Figure 2:
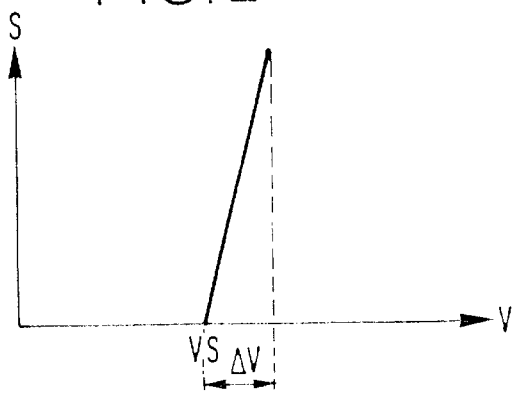
FIG. 2 is a graph showing variation of the output signal from a precision measuring circuit of the invention as a function of variation of the voltage measured by said circuit over a predetermined limited range.

The precision measurement circuit 19 organized in the manner described above thus makes it possible to obtain an amplification effect comparable to that provided by a magnifying glass over a limited range of variation in the voltage V, with this effect being represented on the S/V graph of FIG. 2 which shows variation in the output voltage S obtained at the terminals of resistor 28 of the precision measurement circuit 19 for small variation in the voltage V present across the power supply terminals of a cell, an output voltage S of about 2 volts being obtained, for example, for a variation of about 0.1 volts in the voltage V. This thus makes it possible to stop the charging process accurately, cell by cell, and as late as possible, without running the risk of damaging cells, given that it is now possible to act on the charger 3 to reduce charging current very accurately while charging is taking place. This also makes it possible to measure accurately the internal resistance of any particular cell by calculation, observing the change in voltage that is induced across the terminals thereof by a change in the charging current delivered to the entire set of cells or the discharge current delivered thereby. By way of example, the internal resistance of a cell 2 can be determined by the central control unit 4, when fitted with appropriate known means, on the basis of a change in current leading to a change in voltage of the order of 5 millivolts, the change in current being triggered by a command sent by the central control unit 4 to the charger 3, if charging is taking place. The amount by which the current is changed is naturally selected in conventional manner as a function of the cells 2 making up the set 1 and the ratio between corresponding variations of voltage and of current provide the looked-for resistance.

The magnifying glass effect obtained with the precision measurement circuit 19 associated with a cell 2 also makes it possible to calibrate and/or recalibrate a portion of the measurement system specific to the cell and including the measurement circuit 15 associated with the cell 2. This calibration or recalibration is performed by the central control unit comparing measurements performed quasi-simultaneously by the two measurement circuits 15 and 19 when the voltage across the terminals of the cell 2 associated with these circuits corresponds to the voltage reference value of the precision measurement circuit 19, the central control unit then being provided with programmed means that are not described herein insofar as they stem from well-known techniques.

The results of measurements performed with the precision circuits 19 for the cells 2 with which they are associated can also be used by the central control unit 4 to monitor with great precision the charger 3 and more precisely the charging current applied by the charger to the set 1.

I claim:

1. A charge controlling system for a modular set comprising a plurality of electrochemical cells connected in series via their respective power supply terminals, said system comprising:
   (1) a central control unit;
   (2) for each cell, an individual interface provided with a measurement module which comprises:
      (A) a measuring means for measuring voltage between the power supply terminals of the cells;
      (B) a signal delivery means for delivering a signal that is an image of the measured voltage to the central control unit via a common measurement transducer and under the control of said central control unit,
      (C) a precision measurement circuit having a multiplying effect, so that the interface delivers a largely amplified image signal when the measured voltage corresponds at least approximately to a reference value defined for the measurement circuit and optionally modifiable, said circuit delivering to the central control unit via the common measurement transducer a signal which is an accurate image of the voltage present across the power supply terminals of each cell when the measured voltage is near the reference value.

2. A system according to claim 1, wherein the central control unit comprises means for accurately controlling a reduction in charging current delivered to the set by a charger, by making use of the image signals provided by the respective precision measurement circuits of the interfaces associated with the cells in the set, as the voltages individually present across the power supply terminals of said cells progressively reach said defined reference value.

3. A system according to claim 1, wherein the central control unit includes means for determining internal resistance of each cell of the set under its control by determining the change of voltage obtained by the precision measurement circuit associated with the cell under consideration in response to a determined change in the charging current delivered to the set by the charger under its control.

4. A system according to claim 1, wherein the measurement module of an individual cell interface includes:
   (i) another measurement circuit for providing a measurement signal representative of the voltage present across the power supply terminals of the cell with which the interface is associated, and
   (ii) switch means under the control of the central control unit for selectively directing to said central control unit the image signals provided by each of the measurement circuits associated with the same cell.

5. A system according to claim 4, wherein the central control unit includes means for calibrating the measurement circuit associated with a cell by means of the precision measurement circuit associated with the same cell.

6. The charge controlling system of claim 1, wherein the central control unit is organized around a microcontroller having input/output ports that interchange signals with the interfaces and with a charger.

7. The charge controlling system of claim 1, wherein each measurement module has an associated current bypass module which is governed by the central control unit via a control circuit.

8. The charge controlling system of claim 1, wherein the transducer comprises a measurement resistor associated with a converter which digitizes signals for the central control unit to which the converter is connected.

9. The charge controlling system of claim 7, wherein the measurement circuit comprises an operational amplifier controlled as a function of voltage via a bridge comprising two resistors connected in series, and switched on by a switch by the control circuit.

10. The charge controlling system of claim 1, wherein the precision measurement circuit comprises a differential amplifier whose non-inverting positive input is connected to the common point between two resistors of a divider bridge connected between the positive and negative terminals of the associated cell,
   wherein the inverting negative input of the differential amplifier is connected firstly to the output of the amplifier via a negative feedback resistor and also via a resistor to the common point of a circuit comprising a zener diode and a resistor connected in series between the negative and positive terminals.

11. A monitoring system comprising:
(A) a modular assembly comprising a plurality of electrochemical cells connected in series, wherein the modular assembly comprises:
   a central control unit governing the monitoring system;
   a measurement module for measuring voltage between the terminals of an electrochemical cell in the modular assembly,
   wherein the module comprises:
      (A) means for measuring voltage between the power supply terminals of a corresponding electrochemical cell with which the module is associated
      (B) means for delivering an image signal representing the measured voltage to the central control unit via a common measurement transducer
      (C) a precision measurement circuit having a multiplying effect so that a largely amplified image signal is provided when the measured voltage corresponds at least approximately to a reference value defined for that circuit and optionally modifiable, thereby supplying the central control unit with an accurate image signal of the voltage present across the power supply terminals of the cell associated therewith when the measured voltage is near the reference value.

12. A module according to claim 11, further including:
   another measurement circuit that supplies a measurement signal representative of the voltage present across the power supply terminals of the cell with which the module is associated, and
   switch means, under control of the central control unit to enable said, so that the central control unit selectively receives image signals supplied by each measurement circuit associated with the same cell.

* * * * *